(12) United States Patent
Mueller et al.

(10) Patent No.: US 7,694,292 B2
(45) Date of Patent: Apr. 6, 2010

(54) SYSTEM AND METHOD FOR REDUCTION OF WAIT TIME FOR SOFTWARE UPDATES

(75) Inventors: Manfred Mueller, Erlangen (DE); Georg Geyer, Mühlhausen (DE); Peter Haeuser, Effeltrich (DE); Marco Manchinu, Spardorf (DE)

(73) Assignee: Siemens Aktiengesellschaft, Munich (DE)

( * ) Notice: Subject to any disclaimer, the term of this patent is extended or adjusted under 35 U.S.C. 154(b) by 1282 days.

(21) Appl. No.: 11/074,336

(22) Filed: Mar. 7, 2005

(65) Prior Publication Data

US 2006/0200703 A1    Sep. 7, 2006

(51) Int. Cl.
*G06F 9/44* (2006.01)

(52) U.S. Cl. ..................................... 717/170

(58) Field of Classification Search ............ 714/4, 714/1, 770, 11, 41; 709/201, 213, 217, 221, 709/253; 600/300, 407, 417; 717/162–171
See application file for complete search history.

(56) References Cited

U.S. PATENT DOCUMENTS

| 5,408,409 | A | * | 4/1995 | Glassman et al. | 600/407 |
| 5,751,574 | A | * | 5/1998 | Loebig | 700/82 |
| 6,684,396 | B1 | * | 1/2004 | Brittain et al. | 717/168 |
| 7,203,732 | B2 | * | 4/2007 | McCabe et al. | 709/217 |

* cited by examiner

Primary Examiner—Tuan Anh Vu
(74) Attorney, Agent, or Firm—Brinks, Hofer, Gilson, & Lione

(57) ABSTRACT

A system and method is disclosed for performing maintenance on a mission critical system while minimizing unavailability of the system to users. The system includes software storage having at least production and maintenance portions. Initially, the maintenance and production portions are set to be identical and the system is programmed to operate from the production portion. During maintenance operations, the system is taken off line and the maintenance is performed only on the maintenance portion, leaving the production portion unaltered. Until the maintenance is complete, if the system is required to be available, it may be brought back on-line and directed to continue to operate from the production portion. Once maintenance is complete, the maintenance portion is designated as the production portion and vice versa. The system is then directed to operate from the newly maintained production portion.

11 Claims, 2 Drawing Sheets

SYSTEM AND METHOD FOR REDUCTION OF WAIT TIME FOR SOFTWARE UPDATES

BACKGROUND

Mission critical systems include systems whose availability is vital to the accomplishment of a particular task or goal, such as medical/clinical systems, e.g. medical imaging systems, security systems, such as security screening systems, safety/security/monitoring systems, such as air traffic control systems, communications systems, data processing systems, manufacturing systems, etc.

Maintaining mission critical systems is a complex task. Often, such systems must be taken off line or out of production in order to perform maintenance, such as diagnostics, updates, upgrades, repairs or general upkeep, such as calibration. Where the particular maintenance process requires a significant amount of time to complete, this downtime represents, at the very least, an inconvenience to the users of those systems, and, in many cases, an unacceptable loss of availability of the system. Further, often maintenance processes encounter or reveal unexpected problems which may exacerbate the length of time that the system is unavailable.

In particular, such systems share the common characteristics of complexity, high cost, such as acquisition costs and/or resource/operating costs, and significant loss potential when they are unavailable. The complexity of these systems increases the necessity of maintenance, i.e. necessity of improvements or the likelihood of failure, makes such maintenance procedures non-trivial and increases the likelihood that longer periods of downtime will be needed for the particular procedure as well as increases the likelihood of downtime due to unexpected problems. For example, updates or upgrades to the operating software of a medical imaging device further requires ensuring the device is properly calibrated and functioning correctly to ensure the diagnostic reliability of the device.

Further, the potential for loss if the system were to be unavailable, e.g. the opportunity costs, such as lost revenue in a manufacturing environment, lost diagnostic capability or lost screening capability, can be significant for these devices, and in most cases, unacceptable. For example, if a security screening device fails in an airport, lost capacity or the reliance on alternative, but less reliable, screening methods may result in passenger delays and/or lessened security. Failure of a medical imaging device may delay treatment of life-threatening conditions.

In addition, the high acquisition cost and/or high operating resource costs, such as physical space requirements and/or geographic dispersion, operator cost, etc., of these systems makes providing redundancy impractical. Accordingly, providing a "back-up" system is typically not an option but for the most sensitive and urgent applications. Medical imaging devices, such as MRI scanners, security screening devices, such as explosives detectors, etc., are typically very expensive and very large devices. Providing redundant "back-up" systems to be used in case of the need for maintenance of the primary system would represent both a significant cost burden and a burden on physical space requirements in already-overcrowded airports or hospitals, etc. Further, for such expensive equipment, a back-up system would represent a significant waste of resources or opportunity cost, i.e. waste of a system which could otherwise be used to reduce wait times, increase revenues, etc. However, putting the "back-up" system into production then introduces the same maintenance/unavailability problems discussed above for the original as well as additional systems.

Accordingly, there is a need for a system and method of reducing the amount of time that a mission-critical system is unavailable while maintenance procedures are performed.

DETAILED DESCRIPTION OF THE DRAWINGS AND PRESENTLY PREFERRED EMBODIMENTS

Figure 1:
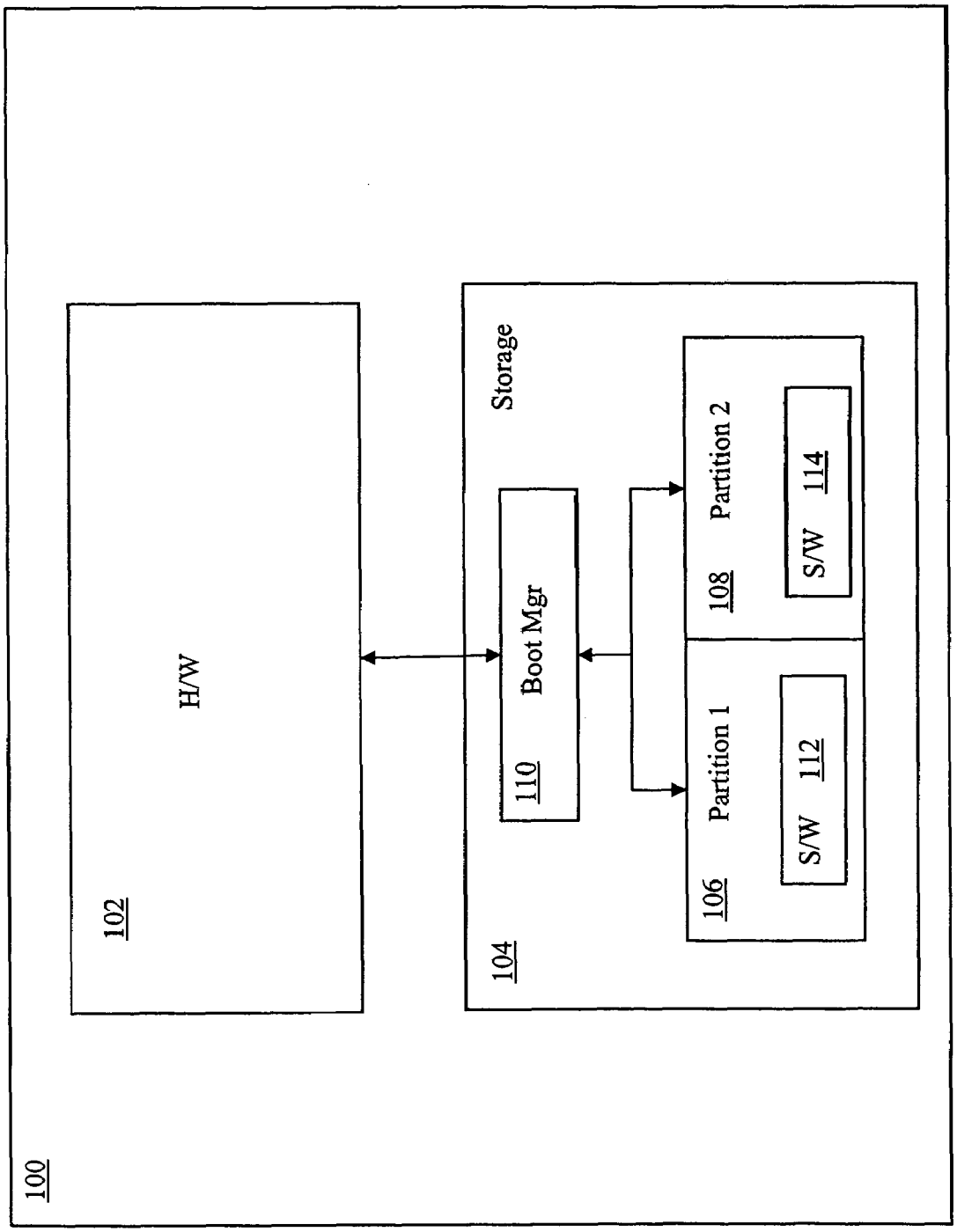
FIG. 1 depicts block diagram of an exemplary mission critical system according to one embodiment.

The disclosed embodiments relate to a system and method for performing maintenance on a mission critical system while minimizing the unavailability of the system to the user or otherwise to be used for its intended purpose. Mission critical systems may be defined as systems whose reliable performance is crucial to the successful performance of the organization in which it is used or any system whose reliable performance is important for ensuring the health and safety of users and/or the public, sometimes referred to as a safety-critical system. Mission critical systems generally refer to systems having the characteristics of complex construction and operation, large acquisition cost, large resource requirements and significant opportunity costs when unavailable. As opposed to general purpose commodity devices. In particular, the disclosed embodiments relate to a system and method for performing maintenance on the software, or a portion thereof, used in a mission critical system, wherein the system includes a combination of hardware and software and where maintenance of the software cannot be performed without making at least some of the hardware unavailable, or otherwise making the system unavailable for its intended purpose. The software may include the operating software of the system, application software, or other data, such as calibration or other parameter data or combinations thereof.

Mission critical system may include imaging systems, such as those used in medical/clinical, security or manufacturing applications. For example, Magnetic Resonance Imaging systems, Computer Tomography systems, x-ray systems, ultrasound based imaging systems, etc. Mission critical systems may also include security systems, such as alarm systems, metal detectors, explosives or chemical detectors, etc. Mission critical systems may further include manufacturing systems, such as manufacturing robots, process controls, machine tools, or quality control devices. Mission critical systems may include monitoring or safety systems, such as air traffic control systems, military systems, communications systems, etc. In addition, mission critical systems may include power generation or power monitoring systems, or emergency response systems, e.g. police, fire.

In one embodiment, the mission critical system is provided with software storage/media including at least a production portion and a separately and/or independently accessible/usable maintenance portion. For example, the memory or hard disk of the system may be provided with multiple partitions or the system may include multiple discrete storage devices/media, such as memories or hard disks, wherein at least one device/medium, e.g. partition, memory or drive, is used for production and another is used for maintenance, as will be described. At the time of manufacture and/or installation, the maintenance and production portions are set to be identical, i.e. contain identical software, and the system is programmed to operate from the production portion. For example, the system is programmed to "boot" from the production partition, memory or disk drive. It will be appreciated that, in alternate embodiments, the data on the production portion may be copied to the maintenance portion at the time of, rather than prior to, the maintenance. During maintenance operations, the system is taken off-line and the particular maintenance procedures are performed only on the maintenance portion of the software storage, leaving the production portion unaltered. Until the maintenance procedures are complete, if the system is required to be available, it may be brought back on-line and directed to continue to operate from the production portion of the software storage.

In this way, the maintenance procedures may be carried out over multiple discontinuous sessions, allowing the system to be available/used in between these sessions. Once the maintenance procedures are complete, the maintenance portion of the software storage is designated as the production portion and the production portion is designated as the maintenance portion. The system is then directed to operate from the newly maintained production portion. This may be accomplished, for example, by reprogramming the system to "boot" from the maintenance portion. Should the maintenance procedures fail, the system can continue to operate from the current production portion with no loss of availability. It will be appreciated that the terms "maintenance" and "production," when used to describe the portions of the system storage, are designators only and indicate the present purpose of the associated portion. Should the purpose of the particular portion be changed, the appropriate designator would be used in reference to that portion and is therefore context dependent. When referring to the production or maintenance portions, the modifiers "new" and "old" or "former" and "current", or similar modifiers may be used to distinguish the re-designation of a portion from maintenance to production or vice versa. For example, the designation "new production portion" may refer to the same portion as the designation "old maintenance portion", etc.

It will be appreciated that where the maintenance and production portion reside on different discrete devices or media, the disclosed embodiments may be utilized to perform maintenance on the devices/media themselves, as opposed to the software contained thereon. For example, the maintenance disk drive or memory can be replaced while the system continues to rely on the production disk drive or memory.

This results in a system where a given maintenance procedure can be distributed over multiple sessions, if necessary, to maintain system availability. These sessions, along with requisite system unavailability may be scheduled at times which are least inconvenient to the users and/or cause the least opportunity costs due to unavailability. At other times, the system continues to be available and function as expected using the unmodified production portion. Only at such time as the maintenance procedures have been completed and validated on the maintenance portion is the system programmed to switch over and operate from the recently maintained software which, with respect to the next maintenance cycle, becomes the production portion while the former production portion becomes the maintenance portion.

Accordingly, the user's perception of the duration of the maintenance procedure, based on the amount of time that the system is unavailable when it is desirable for it to be available, may be reduced, even if the maintenance procedure, in the aggregate, actually takes a longer amount of time to complete.

In one embodiment, during maintenance sessions, where the technician does not need access to the hardware, the system may be made accessible to users, i.e. kept on-line, concurrently with the maintenance. In an alternate embodiment, to ensure safety, security or system integrity, the system is taken off-line during the performance of any maintenance.

Further, should the new production portion fail, the system can be switched back the former production portion while the failure is diagnosed and corrected. This provides for fault tolerance. In an alternate embodiment, more than two portions are provided and the designated maintenance and production portions are rotated among the available portions. This provides multi-generational back-up, i.e. the ability to operate the system based on any one of many previous versions of the software depending upon the number of portions provided.

Once the new production portion is proved, i.e. it is operationally stable and it's operations are validated in actual use, or otherwise, there is no need to further maintain the prior production portion and the new maintenance portion may be updated, such as by mirroring the new production portion to overwrite the maintenance portion. This would then provide redundant back-up in the case where the production portion should fail in a manner unrelated to the maintenance operations performed, such as a hardware failure or data corruption, etc.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

FIG. 1 shows an exemplary mission critical system 100 according to one embodiment. The system 100 includes hardware 102 and storage 104 coupled with the hardware 102. Herein, the phrase "coupled with" is defined to mean directly connected to or indirectly connected through one or more intermediate components. Such intermediate components may include both hardware and software based components. It will be appreciated that, in alternate embodiments, some components of the storage 104 may be implemented in or combined with the hardware 102 and vice versa, and that the architecture of the system 100 is largely implementation dependent. Further, the storage 104 may be contained in a storage device (not shown) which may be part of the hardware 102, such as a disk drive or memory. The hardware 102 may include micro-processors, hard disk drives, memories, sensors, mechanical manipulators, energy (light, RF, acoustic, etc.) emitters and corresponding sensors, communications devices, displays, input devices etc. The storage 104 may include storage devices which store, as will be described in more detail below, the operating software for operating the hardware 102, application software which allows the hardware 102 to perform specific tasks, and other data which assists in the operation of the hardware 102, such as calibration or other parameter data. The storage 104 may further provide for storage of data unrelated to the hardware 102.

The storage 104 includes at least two portions 106, 108, shown as partitions 1 106 and 2 108, and a controller or boot manager 110. The partitions 106, 108 store the software 112 114 as will be described. The boot manager/controller 110 controls which of the portions/partitions will be used by the hardware 102 to operate from and may be re-programmed, as described herein, to switch from one partition/portion 106 108 to another. It will be appreciated that the portions 106, 108 may be implemented as partitions of a single storage device, or as separate storage devices and that the storage devices may include hard disk drives, memories or other devices which implement the disclosed functionality, either now or later developed. Further, while two partitions 106, 108 are shown, it will be appreciated that the system 100 may feature more than two partitions and that these additional partitions be used to augment the disclosed embodiments as described herein. Further, the boot manager/controller 110 may be implemented in software and stored on one or both of the partitions 106 108 or on an additional partition, or the boot manager/controller 110 may be implemented as a combination of hardware and software, or as separate device such as a programmable read only memory, etc.

In one embodiment, the system 100 comprises a magnetic resonance imaging ("MRI") system, such as of a type used in a clinical setting. In this embodiment, the hardware 102 includes the MRI scanner, operator interface, patient alignment mechanisms, and supporting computer hardware, such as the controller processor, image displays, etc. The storage 104 includes the hard disk drives or other storage devices which store the operating system software, application software and diagnostic software, etc.

All of the software which the system 100 utilizes to operate, or otherwise perform its functions, is stored on at least one partition 106 108 in its entirety, e.g. the system 100 is capable of operating solely from one partition to perform all of its functions. This partition is referred to as the "production partition" and the other partition is then referred to as the "maintenance partition," as described above.

The system 100 further includes maintenance software or functions (not shown), which, may be a part of the software stored in the partitions 106 108 or a part of the boot manager/controller 110, which allows a technician to control the availability of the system 100 for use in its intended purpose and perform maintenance procedures on the system 100, including modifying the software stored in the partitions 106 108. In one embodiment, the maintenance software/function prevents the technician from modifying the production partition, and requires that the technician copy the software stored in the production portion to the maintenance portion and then perform the maintenance thereon. In an alternate embodiment, the copying of the software from the production portion to the maintenance portion my be initially performed by the manufacturer of the system 100, and subsequently performed automatically by the boot manager/controller 110, or at the direction of the system 100 operator or maintenance technician, through a copying or mirroring function. In most situations, the technician will want to perform his maintenance on the current version of the software stored in the production portion, and thus a copy of this version will need to be stored on the maintenance partition. The maintenance software/functions further provide the capability to the technician to control which partition is designated as the production partition/portion and which is designated as the maintenance partition/portion for the purposes of which partition the system 100 will operate from in normal use, to provide the functionality disclosed herein.

In an embodiment with more than two partitions 106 108, the maintenance function/software may provide the capability, automated or not, to rotate among the available partitions when determining which partition will have the maintenance performed and which partition is designated as the production partition. In this way, multiple generations of maintenance levels may be maintained allowing regression of the system 100 to previous versions of the software. This may be useful, for example, for diagnosing malfunctions or for testing new features.

Figure 2:
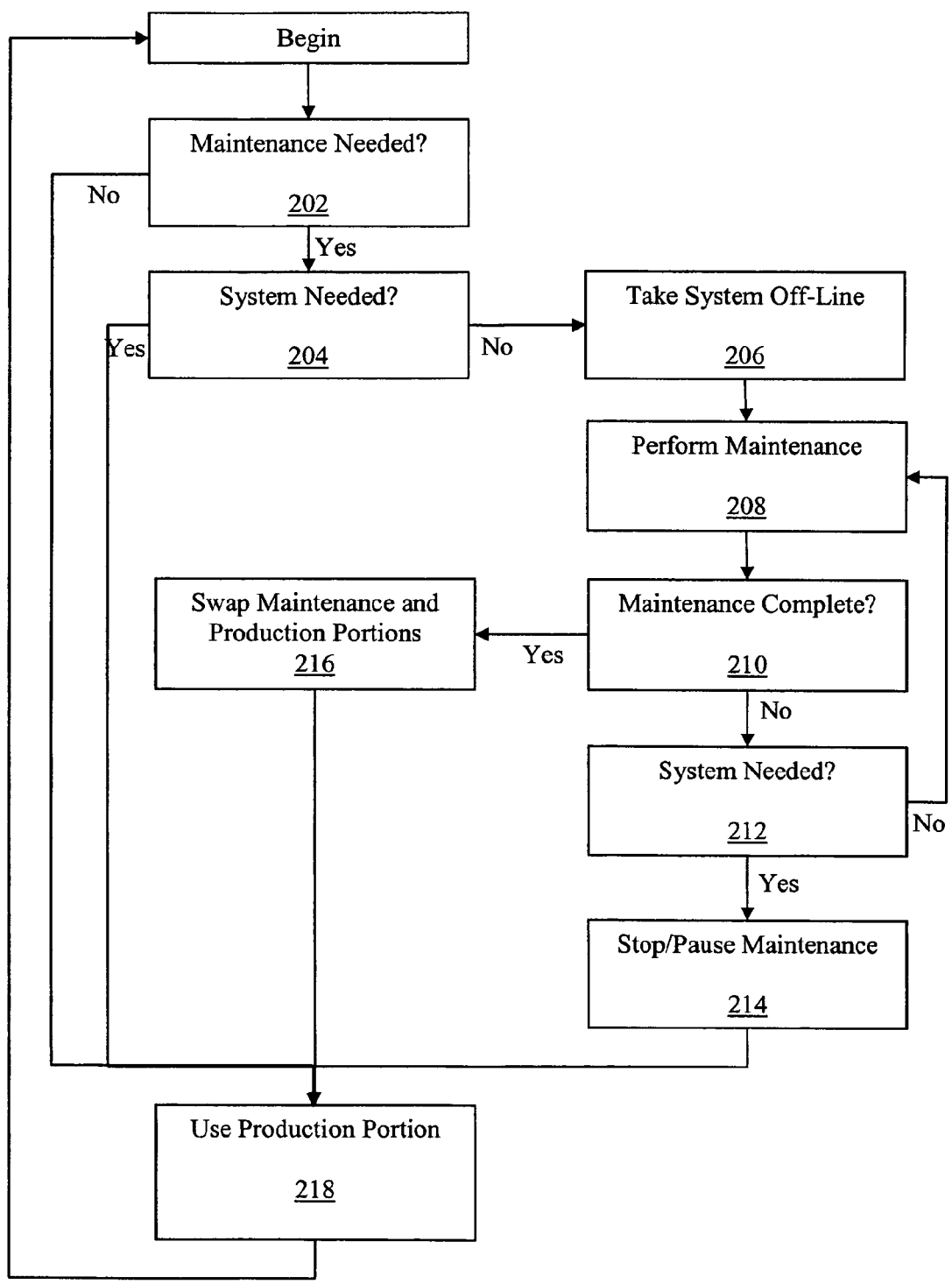
FIG. 2 depicts a flow chart showing the operation of the system of FIG. 1 according to one embodiment.

FIG. 2 shows a flow chart depicting operation of the exemplary system 100. During the course of normal operation of the system 100, where the system 100 is being utilized or is otherwise available to be used for its intended purpose, determinations may be made as to whether maintenance may be needed (block 202). Maintenance may be required as a matter of routine, such as to recalibrate the system 100 or update or improve features, etc. or may be required due to a malfunction. If maintenance is needed, but not necessarily required, it is then determined whether it is okay to take the system 100 off line (block 204). This may include determining peak and non-peak demand periods for the system's 100 availability, as well as the desirability of completing the particular maintenance operations. Typically, for non-required maintenance, the period of least opportunity cost will be selected for the maintenance to be performed, such as at night or over a holiday. In the cases where maintenance is not necessary or the system 100 is needed, the boot manager/controller 110 is unmodified such that the system 100 continues to operate from the software stored current production portion/partition 106 108. In the case that the maintenance is required, the system 100 by default would not be needed, for example because it is not working properly.

If it is determined that maintenance is needed and the system 100 is not needed, the system is taken off line (block 206). The embodiments described herein are not limited to the performance of maintenance operations by a maintenance technician and such operations, including the operations described herein, may be performed by an automated maintenance system, either local to or remote from the system 100. Further, in embodiments where a maintenance technician is performing the operations described herein, that technician may perform these operations either local to or remote from the system 100, such as via a communications network. In one embodiment, for systems 100 or maintenance operations which are of a character such that the system 100 need not be taken off line, the system 100 may be left on-line and available for use during the maintenance operations.

Once the system 100 is off-line, the particular maintenance operations may be performed (block 208). For example, the software may be upgraded or the system 100 may be recalibrated, etc. These maintenance operations are performed on the maintenance portion/partition 106 108. The production portion/partition 106 108 is left unaltered, or at least substantially unaltered. Prior to the maintenance operations, the software from the production portion/partition 106 108 is copied to the maintenance portion/partition 106 108. As was described above, this copying may have taken place prior to the initiation of the maintenance operations or as a result thereof, either automatically or manually. While it is preferable that the maintenance be performed on the most current version of the software being used in actual use, i.e. stored on the production portion, there may be situations where this is not desirable. In one embodiment, controls are provided to allow the maintenance technician to choose to copy over the software from the production portion or perform the maintenance on the last version stored on the maintenance portion without first copying over the software from the production portion.

If the maintenance is complete (block 210), the system 100, via the boot manager/controller 110, is directed to operate from the maintenance portion 106 108, that is, the production and maintenance portions/partitions are swapped such that the system 100 now operates from what was the maintenance portion, now the production portion (block 218), and the prior production portion is designated as the maintenance portion for the next maintenance procedures which are to be performed at a later time (block 216). It will be appreciated that there are numerous methods/mechanisms by which the system 100 may be programmatically directed to operate from one partition 106 108 or another and that all such methods/mechanisms are contemplated. In one embodiment, the maintenance portion 106 108 may undergo validation prior to being switched over to ensure that the system 100 will operate as expected.

If the maintenance is not complete, such as because more time is needed or there have been unexpected delays, it is then determined whether or not the system 100 is needed for use (block 212). If the system 100 is not needed or the system 100 is non-functional due to the need for the particular maintenance procedures, the maintenance operations may continue. However, if the system 100 is needed and is functional, then the maintenance procedures may be interrupted or paused (block 214) and the system 100 may be used based on the current production portion 106 108 (block 218), which as discussed, remained substantially unaffected by the maintenance procedures, or portions thereof, performed thus far. This may happen, for example, when the maintenance sessions are limited to the night time hours but the sessions span multiple nights. Therefore, the system 100 must be made available during the daytime hours for use.

At a later time, the need for maintenance and the need for the system 100 may be reassessed and a determination made as to whether interrupted maintenance procedures may be resumed.

In an alternate embodiment, the operating/application software of the system 100 may be maintained on separate partitions 106 108 from the calibration data or other parameter data used to calibrate the system, which itself may be maintained on a set of partitions 106 108 in accordance with the disclosed embodiments. In this embodiment, the operating/application software of both the maintenance and production portions/partitions 106 108 share access to the calibration/parameter portion(s)/partition(s) as a common repository of calibration or other parameter data. This allows maintenance operations, as described above, to be performed solely on the operating/application software without affecting the calibration or other parameter data. Or conversely, where the calibration/parameter data is stored in multiple portions/partitions, as described, allows maintenance operations, as described above, to be performed on the calibration/parameter data without affecting the operating/application software. It will be appreciated that the software of the system 100 may be segregated and arranged on multiple partitions, as described above, in a myriad of ways, and that the disclosed embodiments are applicable to any such arrangement.

As described, the disclosed embodiments allow time consuming updates to be performed over multiple discontinuous sessions to avoid lengthy down time of the overall system, or the perception thereof. It will be appreciated that the disclosed embodiments may be used to supplement other methods of fault tolerance, such as redundancy, etc.

It is therefore intended that the foregoing detailed description be regarded as illustrative rather than limiting, and that it be understood that it is the following claims, including all equivalents, that are intended to define the spirit and scope of this invention.

We claim:

1. A computer implemented method of maintaining a mission critical system by a first user so as to be available for use by a second user, the system including hardware and computer data on which the operation of the hardware depends, the system further including a controller coupled with the hardware, the method comprising:

providing storage coupled with the hardware and the controller and operative to store the computer data, the storage comprising first and second portions;

storing the computer data in the first portion of the storage;

operating the hardware based on the computer data stored in the first portion;

receiving, by the controller via a first user interface, an indication from the first user to make the system unavailable for use during a maintenance operation and, in response thereto, making, by the controller, the system unavailable for use during the maintenance operation and, substantially concurrently therewith, copying, by the controller, the computer data from the first portion to the second portion and subsequently allowing, by the controller, the first user to modify a copy of the computer data stored in the second portion;

receiving, by the controller via a second user interface while the system is unavailable, an indication from the second user to make the system available for use and, in response thereto: making, by the controller, the system available for use and operating the system based on the second portion comprising the modified copy of the computer data, if an indication has been received from the first user that the first user has completed modifying the copy of the computer data stored in the second portion prior to the receiving of the indication to make the system available for use; and otherwise making the system available for use by interrupting, via the first user interface, the first user's modification of the copy of the computer data stored in the second portion and, subsequent thereto, operating the system based on the computer data stored in the first portion.

2. The computer implemented method of claim 1, wherein the system comprises a magnetic resonance imaging system.

3. The computer implemented method of claim 1, wherein the computer data includes computer software.

4. The computer implemented method of claim 1, wherein the storage comprises a hard disk drive, the first and second portions comprising first and second partitions of the hard disk drive.

5. The computer implemented method of claim 1, further comprising:

determining, prior to the making of the system unavailable, whether the indication has been received to make the system available for use and delaying the making of the system unavailable and the allowance of the first user to modify the copy of the computer data stored in the second portion if the indication has been received.

6. A controller for allowing maintenance of a mission critical system by a first user so as to be available for use by a second user, the mission critical system including hardware and computer data on which the operation of the hardware depends, the controller comprising:

storage having first and second portions, the first portion being operative to store the computer data;

first logic coupled with the storage and operative to operate the mission critical system based on the first portion;

second logic coupled with the first logic and the storage and operative to receive an indication from the first user, via a first user interface, to make the mission critical system unavailable for use during a maintenance operation and in response thereto make the mission critical system unavailable for use during the maintenance operation, and, substantially concurrently therewith, copy the computer data from the first portion to the second portion and subsequently allow the first user to modify a copy of the computer data stored in the second portion, wherein the second logic prevents substantial modification of the computer data stored in the first portion;

third logic coupled with the second logic and the storage and operative to receive an indication from the second user, via a second user interface while the mission critical system is unavailable, to make the mission critical system available for use and in response thereto: make the mission critical system available for use and configure the operation of the system to operate based on the second portion if an indication has been received from the first user that the modifications are complete; and otherwise the third logic being further operative to interrupt, via the first user interface, the first user's modification of the copy of the computer data stored in the second portion and, subsequent thereto, make the mission critical system available for use and operate the mission critical system based on the computer data stored in the first portion.

7. The controller of claim 6, wherein the system comprises a magnetic resonance imaging system.

8. The controller of claim 6, wherein the computer data includes computer software.

9. The controller of claim 6, wherein the storage comprises a hard disk drive, the first and second portions comprising first and second partitions of the hard disk drive.

10. The controller of claim 6, wherein the second logic is further operative to determine, prior to the allowance of the first user's modifications, whether the indication to make the mission critical system available for use has been received and delay the making of the system unavailable and the allowance of the first user's modifications if the indication to make the mission critical system available has been received.

11. A controller for allowing maintenance of a mission critical system by a first user so as to be available for use by a second user, the mission critical system including hardware and computer data on which the operation of the hardware depends, the controller comprising:

storage means coupled with the hardware for storing the computer data, the storage means comprising first and second portions;

means for storing the computer data in the first portion of the storage means;

means for operating the hardware based on the computer data stored in the first portion;

means for receiving an indication from the first user, via a first user interface, to make the system unavailable for use during a maintenance operation and, in response thereto, making the system unavailable for use during the maintenance operation and, substantially concurrently therewith, copying the computer data from the first portion to the second portion and subsequently allowing the first user to modify a copy of the computer data stored in the second portion;

means for receiving an indication from the second user, via a second user interface while the system is unavailable, to make the system available for use and, in response thereto: making the system available for use and operating the system based on the second portion comprising the modified copy of the computer data, if an indication has been received from the first user that the user has completed modifying the copy of the computer data stored in the second portion prior to the receiving of the indication to make the system available for use; and otherwise making the system available for use by interrupting, via the first user interface, the first user's modification of the copy of the computer data stored in the second portion and, subsequent thereto, operating the system based on the computer data stored in the first portion.

* * * * *